(12) United States Patent
Murayama et al.

(10) Patent No.: US 11,979,095 B2
(45) Date of Patent: May 7, 2024

(54) DISCHARGE CONTROL CIRCUIT AND POWER CONVERSION DEVICE

(71) Applicant: Hitachi Astemo, Ltd., Hitachinaka (JP)

(72) Inventors: Norio Murayama, Hitachinaka (JP); Takeshi Yoshida, Hitachinaka (JP); Takahiro Nishida, Hitachinaka (JP); Itsuro Nomura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 258 days.

(21) Appl. No.: 17/638,403

(22) PCT Filed: Jul. 31, 2020

(86) PCT No.: PCT/JP2020/029398
§ 371 (c)(1),
(2) Date: Feb. 25, 2022

(87) PCT Pub. No.: WO2021/039277
PCT Pub. Date: Mar. 4, 2021

(65) Prior Publication Data
US 2022/0311355 A1    Sep. 29, 2022

(30) Foreign Application Priority Data

Aug. 30, 2019 (JP) .................................. 2019-157696

(51) Int. Cl.
*H02M 1/32* (2007.01)
*H02H 3/20* (2006.01)
(Continued)

(52) U.S. Cl.
CPC ............ *H02M 7/537* (2013.01); *H02H 3/202* (2013.01); *H02H 9/041* (2013.01); *H02M 1/322* (2021.05)

(58) Field of Classification Search
CPC ...... H02M 1/322; H02M 7/537; H02H 3/202; H02H 9/041; Y02T 10/70; Y02T 10/72
See application file for complete search history.

(56) References Cited

U.S. PATENT DOCUMENTS

| 2011/0031939 A1* | 2/2011 | Funaba ................. H02J 7/0031 320/166 |
| 2012/0020136 A1 | 1/2012 | Akaishi et al. |

(Continued)

FOREIGN PATENT DOCUMENTS

| JP | 2010-206909 A | 9/2010 |
| JP | 2011-41363 A | 2/2011 |

(Continued)

OTHER PUBLICATIONS

International Search Report (PCT/ISA/210) issued in PCT Application No. PCT/JP2020/029398 dated Nov. 2, 2020 with English translation (four (4) pages).

(Continued)

*Primary Examiner* — Kyle J Moody
*Assistant Examiner* — Jye-June Lee
(74) *Attorney, Agent, or Firm* — Crowell & Moring LLP

(57) ABSTRACT

An object of the present invention is to provide a power conversion device capable of specifying a failure location of an inverter in detail when an attempt of active discharge fails. There are provided an arithmetic operation circuit 102 that outputs a discharge instruction to control a discharge operation based on a voltage between both ends of a discharge circuit, and an output circuit 203 that outputs a drive signal based on the control signal. The arithmetic operation circuit 102 monitors an amount of the decreased voltage between both the ends of the discharge circuit, an LV read back signal being an output of the arithmetic operation (Continued)

circuit 102, and an HV read back signal being an output of the output circuit 203, and specifies a failure location.

7 Claims, 13 Drawing Sheets

(51) Int. Cl.
*H02H 9/04* (2006.01)
*H02M 7/537* (2006.01)

(56) References Cited

U.S. PATENT DOCUMENTS

| | | | | |
|---|---|---|---|---|
| 2012/0268079 A1* | 10/2012 | Nakamura | ............ | H02J 7/0031 320/166 |
| 2013/0003429 A1 | 1/2013 | Murahashi | | |
| 2015/0097426 A1* | 4/2015 | Yamane | ............ | H02M 3/1584 307/10.1 |
| 2017/0355267 A1* | 12/2017 | Zhou | ............ | H02M 1/32 |
| 2020/0225268 A1 | 7/2020 | Nagayasu | | |

FOREIGN PATENT DOCUMENTS

| | | | | |
|---|---|---|---|---|
| JP | 2019-68639 A | * | 4/2019 | ............ H02M 7/48 |
| JP | 2019-68639 A | | 4/2019 | |
| WO | WO 2011/104848 A1 | | 9/2011 | |
| WO | WO 2019/039047 A1 | | 2/2019 | |
| WO | WO 2019/043828 A1 | | 3/2019 | |

OTHER PUBLICATIONS

Japanese-language Written Opinion (PCT/ISA/237) issued in PCT Application No. PCT/JP2020/029398 dated Nov. 2, 2020 (three (3) pages).

* cited by examiner

FIG. 8

| | (1) DIAGNOSIS OF DISCHARGE TIME | (2) DIAGNOSIS OF AMOUNT OF DECREASED VOLTAGE | (3) DIAGNOSIS OF HV OUTPUT | | | (4) DIAGNOSIS OF LV OUTPUT | | |
|---|---|---|---|---|---|---|---|---|
| | | | ON FIXING | OFF FIXING | PWM CHECK | ON FIXING | OFF FIXING | PWM CHECK |
| OK | OK | OK | OK | OK | OK | OK | OK | OK |
| INSUFFICIENCY OF DISCHARGE AMOUNT | NG | OK | OK | OK | OK | OK | OK | OK |
| CONTACTOR BEING CLOSED | NG | NG | OK | OK | OK | OK | OK | OK |
| SHORT-CIRCUIT OF DISCHARGE RESISTOR | NG | NG | OK | OK | OK | OK | OK | OK |
| OPEN-CIRCUIT OF DISCHARGE RESISTOR | NG | NG | OK | NG | NG | OK | OK | OK |
| OFF-FIXING OF SUB CPU | NG | NG | OK | NG | NG | OK | NG | NG |
| ON-FIXING OF SUB CPU | OK | OK | NG | OK | NG | NG | OK | NG |
| FAILURE OF SUB CPU | NG | NG | NG | NG | NG | NG | NG | NG |

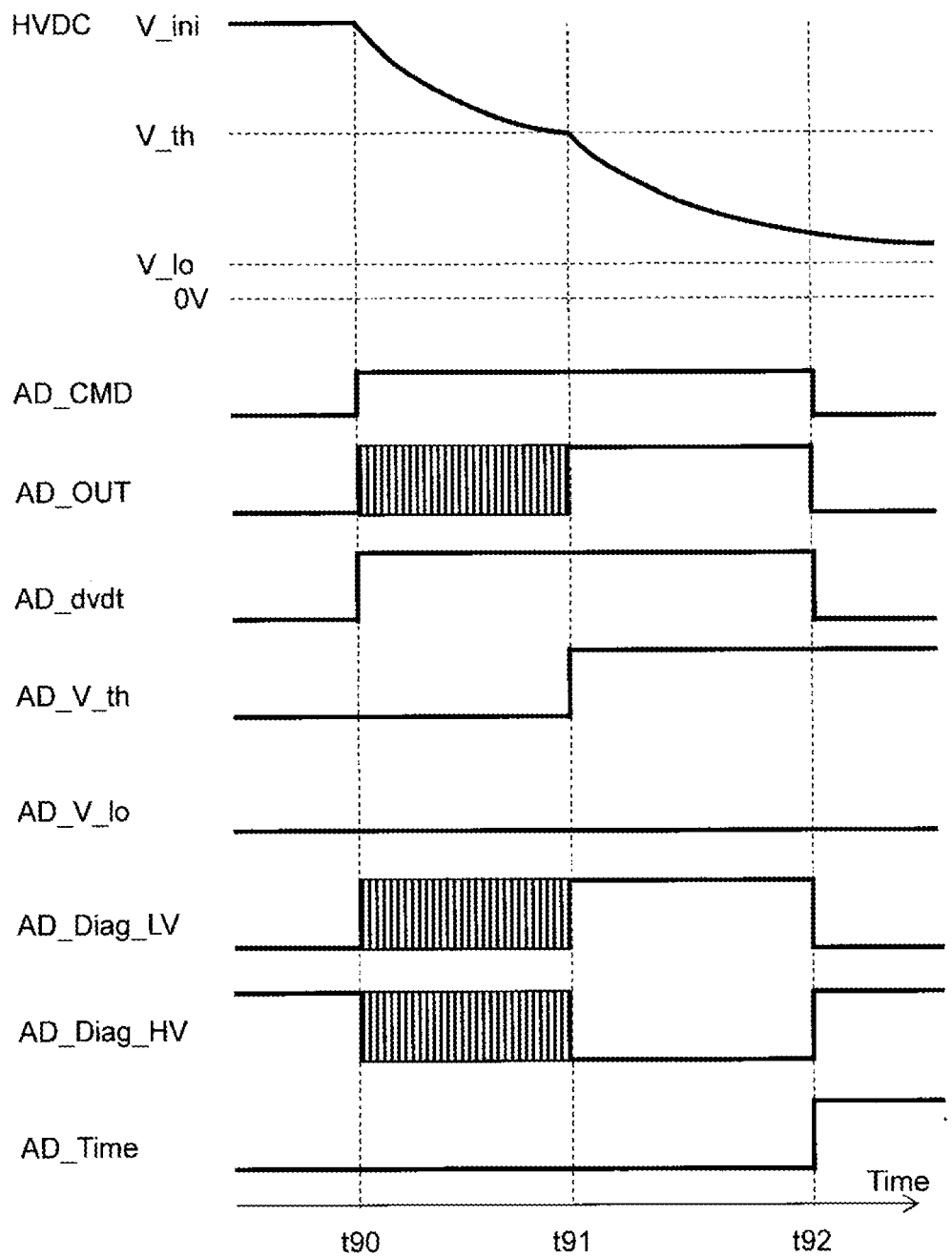

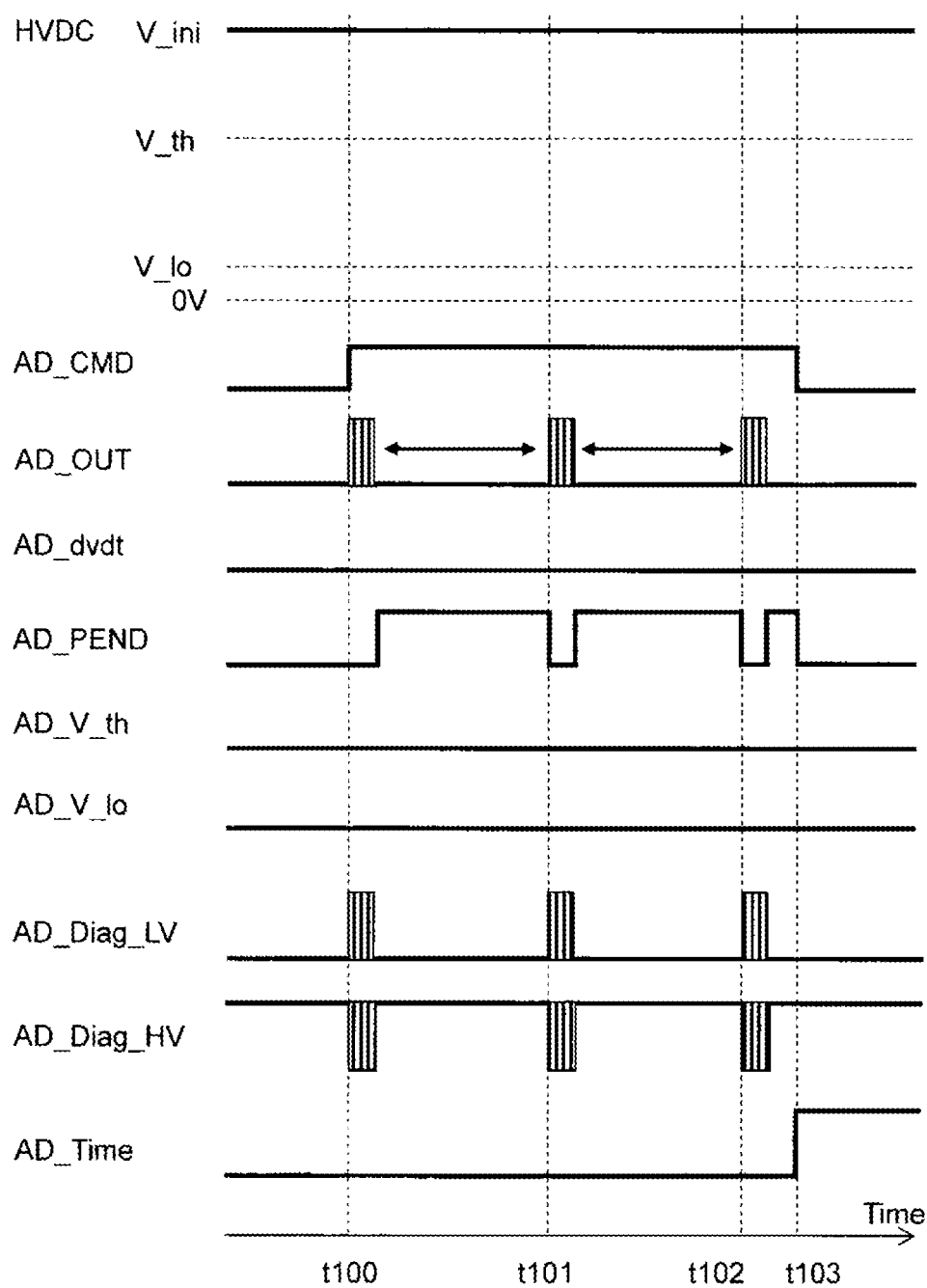

(SHORT-CIRCUIT FAILURE OF DISCHARGE RESISTOR)

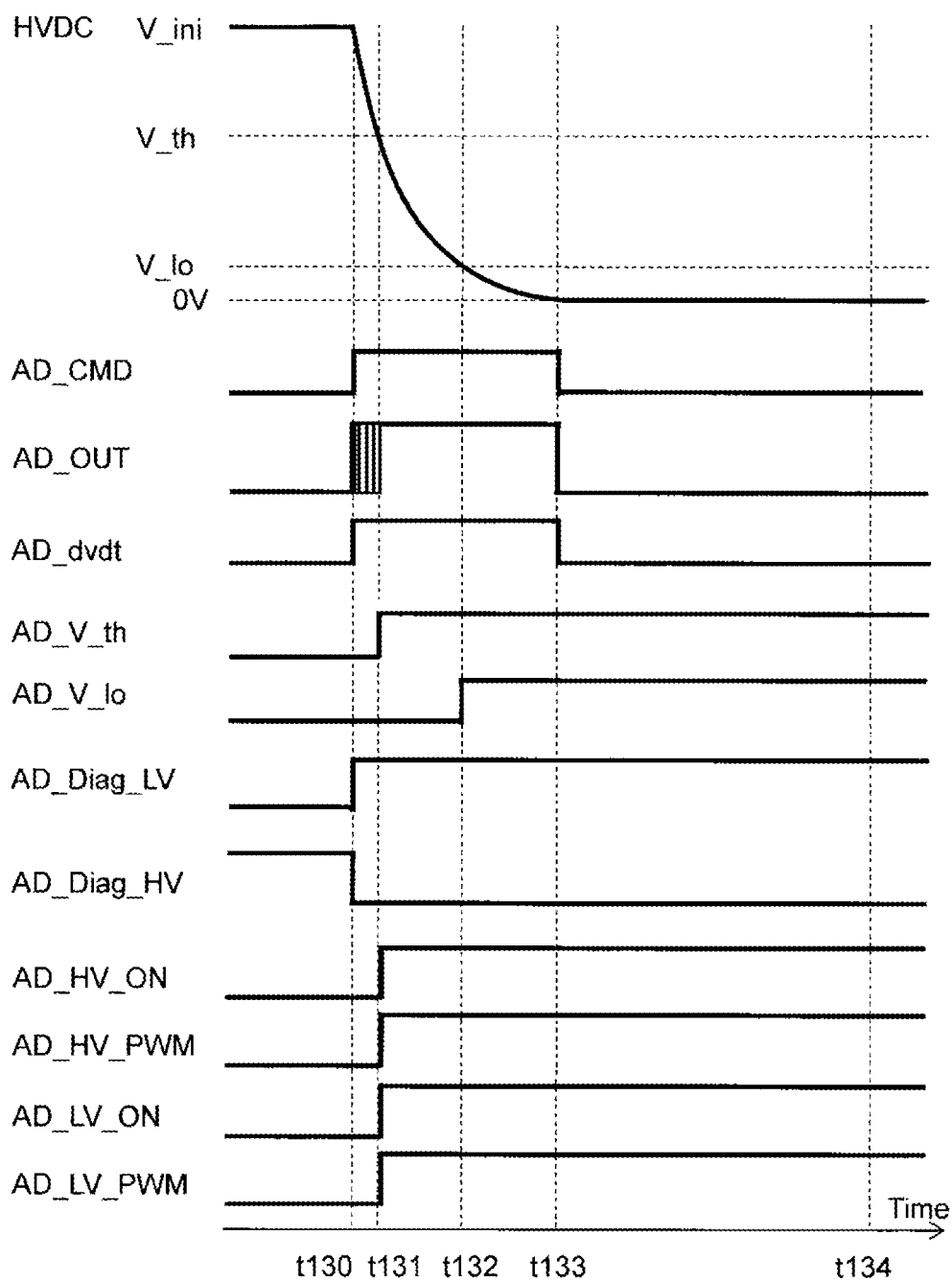

DISCHARGE CONTROL CIRCUIT AND POWER CONVERSION DEVICE

TECHNICAL FIELD

The present invention relates to a rapid active discharge control circuit for a high voltage capacitor in a power conversion device applied to a traveling system of a hybrid vehicle, an electric vehicle, or the like, and more particularly to a method of diagnosing a failure location of the discharge control circuit.

BACKGROUND ART

In a system in which a motor is driven by a high-voltage battery, such as a hybrid vehicle or an electric vehicle, there is a demand for rapid disconnection of an inverter from the high-voltage battery and rapid discharge of residual charges in the inverter. For example, in US Regulation FMVSS305 (prevention of electrolyte outflow and electric shock in electric vehicles), it is necessary to rapidly discharge the residual charges of a smoothing capacitor connected to an input stage up to a predetermined value in order to set an output voltage of an inverter to be equal to or less than a predetermined value within 5 seconds after a vehicle stops due to a collision or the like.

Such discharge control is a function performed for the purpose of protecting the driver and the paramedic from an electric shock when a collision occurs. There is active discharge as a representative technique. By performing the active discharge, it is possible to consume charges accumulated in the smoothing capacitor of an inverter circuit by a discharge resistor and to rapidly lower the output voltage of the inverter.

For example, there is PTL 1 as a conventional example related to the discharge control. In order to prevent an occurrence of a situation in which excessive power is consumed by the discharge resistor when the discharge control is performed, duty control of ON/OFF of a switching element for discharge control is performed at a high voltage, and, at a low voltage, the switching element for the discharge control is fixed to an ON state to increase a discharge speed.

Meanwhile, the discharge control performed for the purpose of transitioning the inverter to a safe state in an emergency requires constant verification of a normal operation from the viewpoint of functional safety. In the discharge control as described above, since the inverter is operated by a command different from the normal control, the soundness of the discharge control cannot be verified during the normal control. Thus, it is common to mount a diagnosis function. For example, a diagnosis function as disclosed in PTL 2 can be exemplified. In performing discharge control, when contactors of the battery are in the closed state for some reason, there is a concern that an excessive current flows in the discharge resistor for a long time, and thus the discharge resistor is damaged by heat generation. In order to avoid an occurrence of such a situation, when the terminal voltage of a capacitor exceeds a voltage decrease characteristic set in advance, the switching element for the discharge control is cut off to stop discharge by the discharge resistor.

CITATION LIST

Patent Literature

PTL 1: WO 2019/039047 A
PTL 2: JP 2011-041363 A

SUMMARY OF INVENTION

Technical Problem

The diagnosis function described above is a diagnosis function having the purpose of detecting that active discharge is performed in a contactor closed state and avoiding damage of discharge resistor due to heat generation. However, there is a problem that, since it is not possible to classify whether an abnormality has occurred in the inverter or in the peripheral device, it is not possible to perform appropriate control when a failure has occurred. For example, there is a concern that, when the active discharge is performed due to a difference between an instruction to the contactor and an actual operation timing, while the contactor is maintained in the closed state, the inverter does not have a failure, but the diagnosis function erroneously detects an abnormality as an active discharge failure.

An object of the present invention is to provide a power conversion device and a control method of the power conversion device, that are capable of, when an attempt of active discharge fails, specifying a failure location of an inverter in detail, performing appropriate control in accordance with a failure mode, and more reliably shifting the inverter to a safe state.

Solution to Problem

In order to achieve the above object, according to the present invention, a discharge control circuit includes a discharge circuit in which a discharge resistor and a switching element are connected in series, and a control circuit that controls on/off of the switching element to control discharge by the discharge resistor. The control circuit includes an arithmetic operation circuit that outputs a control signal for controlling the switching element based on a voltage between both ends of the discharge circuit, and an output circuit that outputs a drive signal for driving the switching element based on the control signal. The arithmetic operation circuit includes a detection-circuit monitoring unit that detects an amount of decreased voltage between both the ends of the discharge circuit, an arithmetic-operation-circuit monitoring unit that monitors an output of the arithmetic operation circuit, and an output-circuit monitoring unit that monitors an output of the output circuit.

Further, according to the present invention, the discharge control circuit has a function of, when the voltage across both the ends of the discharge circuit is not lower than a predetermined threshold value within a predetermined time after the arithmetic operation circuit outputs the control signal for an instruction of discharge, determining the circuit in which an abnormality has occurred, among the discharge circuit, the arithmetic operation circuit, and the output circuit, based on a first signal and a second signal, the first signal indicating a monitoring result of the arithmetic-operation-circuit monitoring unit, and the second signal indicating a monitoring result of the output-circuit monitoring unit.

Advantageous Effects of Invention

According to the present invention, by combining a plurality of diagnosis functions, when an attempt of active discharge fails, it is possible to specify a failure location in detail, perform appropriate control in accordance with a failure mode, and more reliably shift an inverter to a safe state. Further, it is possible to leave the diagnosis result as a failure history, to recognize a location where a failure easily occurs in the inverter by analyzing the failure history, and to use the location for a product design having higher safety. In other words, it is possible to contribute to improvement of vehicle maintainability by rapidly specifying a failure site.

BRIEF DESCRIPTION OF DRAWINGS

FIG. 8 is a metric diagram for specifying a failure location by combining a plurality of diagnosis results.

FIG. 9 is a chart diagram when a discharge amount is insufficient.

FIG. 10 is a chart diagram when a contactor is closed.

FIG. 14 is a chart diagram in ON-fixing failure of the output of the sub CPU.

DESCRIPTION OF EMBODIMENTS

Figure 1:
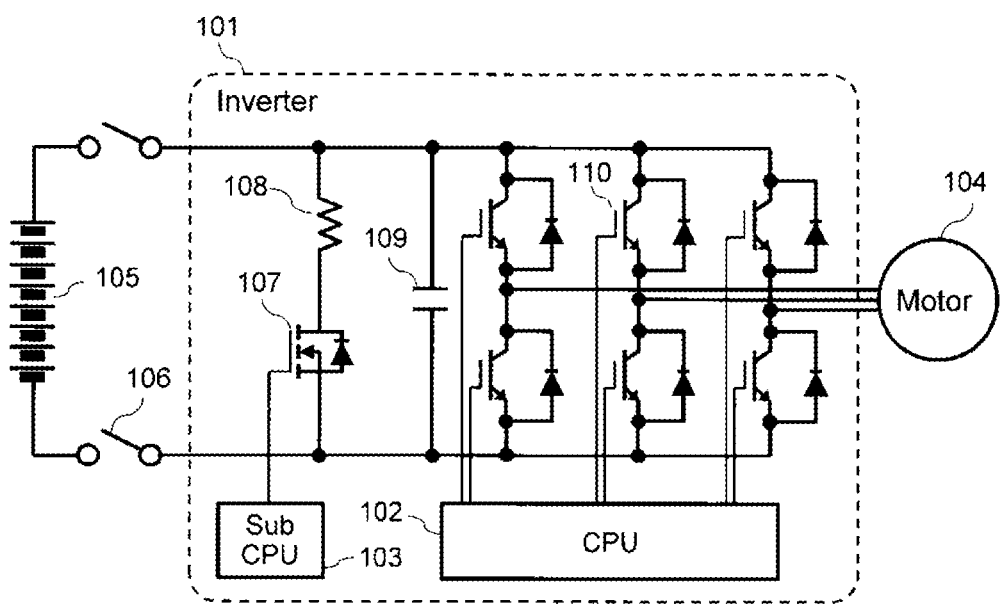
FIG. 1 is a schematic configuration diagram of a power conversion device according to an embodiment of the present invention.

Hereinafter, an embodiment of a power conversion device according to the present invention will be described with reference to the drawings. In the drawings, the same elements are denoted by the same reference signs, and repetitive description will be omitted.

FIG. 1 is a schematic configuration diagram of a power conversion device 101 according to an embodiment of the present invention. The power conversion device 101 includes a main control device (CPU) 102, a first switching element 110 controlled by the main control device 102, a sub control device (sub CPU) 103, a second switching element 107 controlled by the sub control device 103, a capacitor 109 that stores electric charges, and a discharge resistor 108 that consumes the electric charges. In the power conversion device 101, DC power supplied from a battery 105 is input via a contactor 106, and AC power for driving a motor 104 is output.

Figure 2:
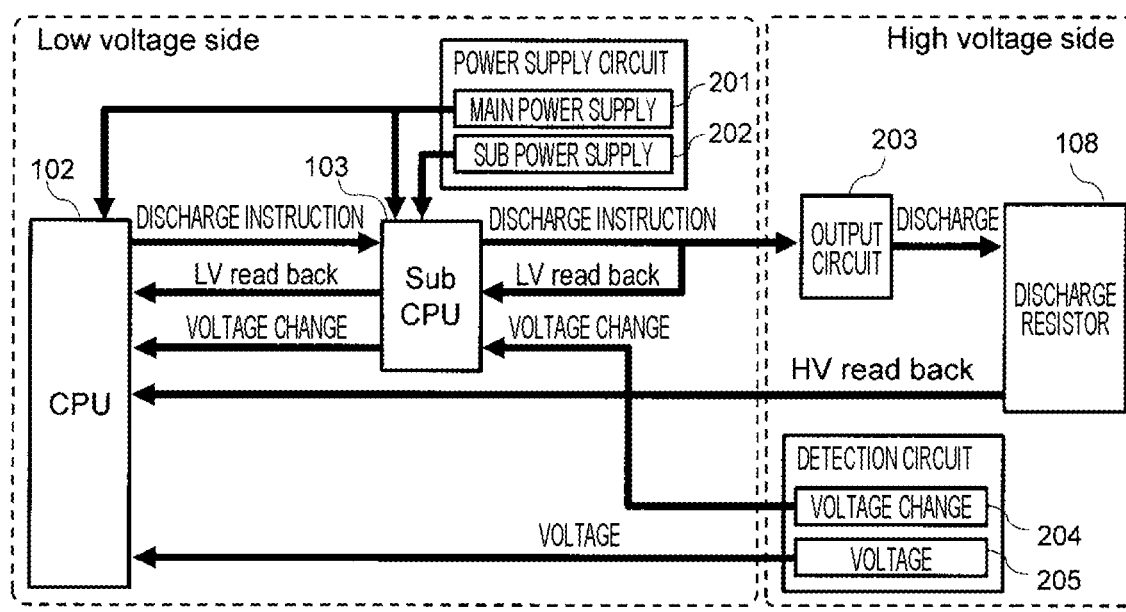
FIG. 2 is a functional block diagram of a discharge control circuit according to the embodiment of the present invention.

FIG. 2 is a configuration example of functional blocks of the power conversion device illustrated in FIG. 1. FIG. 2 particularly illustrates a control system (discharge control circuit) of a discharge circuit configured by the second switching element 107 and the discharge resistor 108. The main control device 102, the sub control device 103, and a power supply circuit that supplies power to the main control device 102 and the sub control device 103 are disposed on a low voltage (LV) side. An output circuit 203, a voltage change detection circuit 204, and a voltage detection circuit 205 are disposed on a high voltage (HV) side. The output circuit 203 drives the second switching element 107 based on a discharge instruction and causes the discharge resistor 108 to perform a discharge operation. Signal transmission between the LV side and the HV side is performed via a photocoupler or the like.

The main control device 102 and the sub control device 103 operate by receiving power supply from a main power supply 201. The discharge instruction output from the main control device 102 is input to the output circuit 203 via the sub control device 103, and thus electric charges are consumed by the discharge resistor 108. The discharge instruction output from the sub control device 103 is input to the sub control device 103 as an LV read back signal and transmitted to the main control device 102.

A terminal voltage of the discharge resistor 108 is detected by a shunt resistor connected in series to the switching element 107, and is input to the main control device 102 as an HV read back signal. The voltage change detection circuit 204 detects whether the voltage decreases as intended during the discharge of the electric charges. The voltage change detected by the voltage change detection circuit 204 is input to the sub control device 103 and transmitted to the main control device 102. The HV voltage detection circuit 205 detects a terminal voltage of the capacitor 109 and inputs the terminal voltage to the main control device 102.

Figure 3:
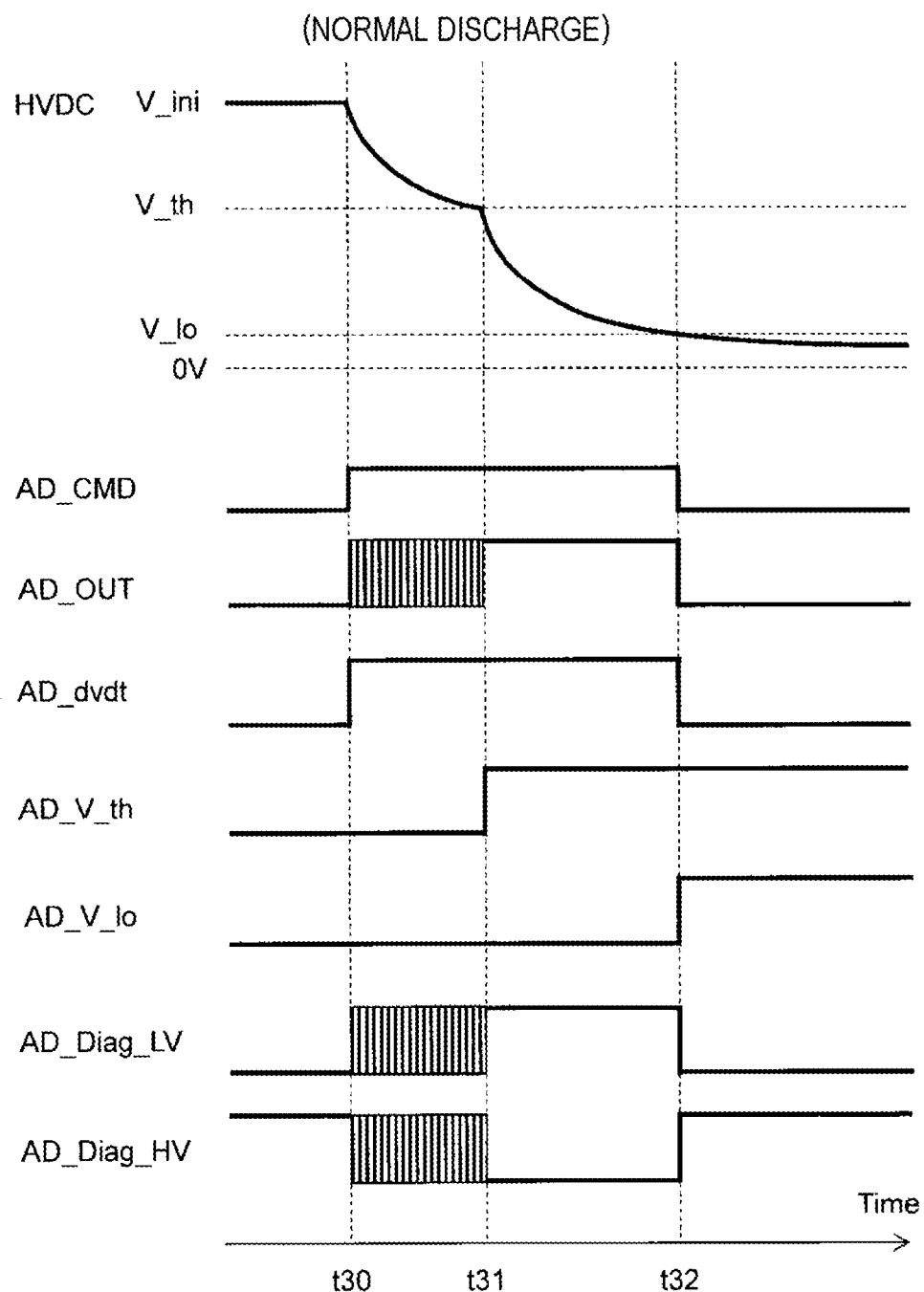
FIG. 3 is a chart diagram in normal discharge.

Before describing a method of diagnosing active discharge in the present embodiment, control of active discharge in the present embodiment will be described. FIG. 3 is a chart diagram in normal discharge. An object of the discharge control is to perform the discharge control from a state in which HVDC has a value of V_ini and to lower the voltage to be equal to or less than V_lo within a predetermined time.

While the discharge instruction from the main control device 102 is output as AD_CMD, AD_OUT is output from the output circuit 203 to the discharge resistor. In the present embodiment, the pulse pattern of AD_OUT indicating a period in which the electric charges are consumed by the discharge resistor is changed before and after the HV voltage is lower than a threshold value V_th. Specifically, when the HV voltage is equal to or higher than the threshold value V_th (time points t30 to t31), an instruction of pulse-like energization for alternately switching on/off of the second switching element 107 is issued. Thus, an occurrence of a situation in which an excessive current flows through the discharge resistor 108 is prevented. When the discharge progresses and the HV voltage is lower than the threshold value V_th (time points t31 to t32), the second switching element 107 is normally controlled to be in an on state, and the electric charges of the capacitor 109 are rapidly discharged by the discharge resistor 108.

When the voltage change detected by the voltage change detection circuit 204 described above is equal to or more than a predetermined value, it is assumed that the amount of the decreased voltage per unit time is as expected, and 1 is set as the value of AD_dvdt. When the HV voltage is lower than the threshold value V_th, the value of AD_V_th is set to 1. When the HV voltage is lower than the threshold value V_lo, the value of AD_V_lo is set to 1. The threshold value V_lo is a discharge target voltage, and is a threshold value for determining that the voltage has dropped to the safe state. Here, since the HV voltage is lower than V_lo at the time point t32, AD_V_lo=1, and the discharge operation is ended at this time point.

As will be described later, in the present embodiment, the discharge control circuit compares AD_Diag_LV being a read back signal on the LV side, and AD_Diag_HV being a read back signal on the HV side, to AD_OUT. In FIG. 3, all of AD_Diag_LV, AD_Diag_HV, and AD_OUT are equal to each other, and thus it can be determined that the intended signal is output. Thus, it can be determine that the active discharge is normally performed. In the present embodiment described below, only AD_Diag_HV is an inverted signal.

The main control device 102 mainly diagnoses the active discharge. By comparing the discharge instruction from the main control device 102 with the LV read back signal and the HV read back signal, a region of an unintended output is specified, and an occurrence of an abnormality is detected. Furthermore, it is possible to recognize the movement of the voltage due to the discharge by using the voltage change and a voltage signal.

A method in which, when attempt of the active discharge fails, a failure location is specified in detail and appropriate control is performed in accordance with a failure mode, by combining a plurality of diagnosis results will be described below. First, diagnosis procedures of (1) diagnosis of a discharge time, (2) diagnosis of the amount of the decreased voltage, (3) diagnosis of an HV output result, and (4) diagnosis of an LV output result will be described with reference to flowcharts illustrated in FIGS. 4 to 7.

Figure 4:
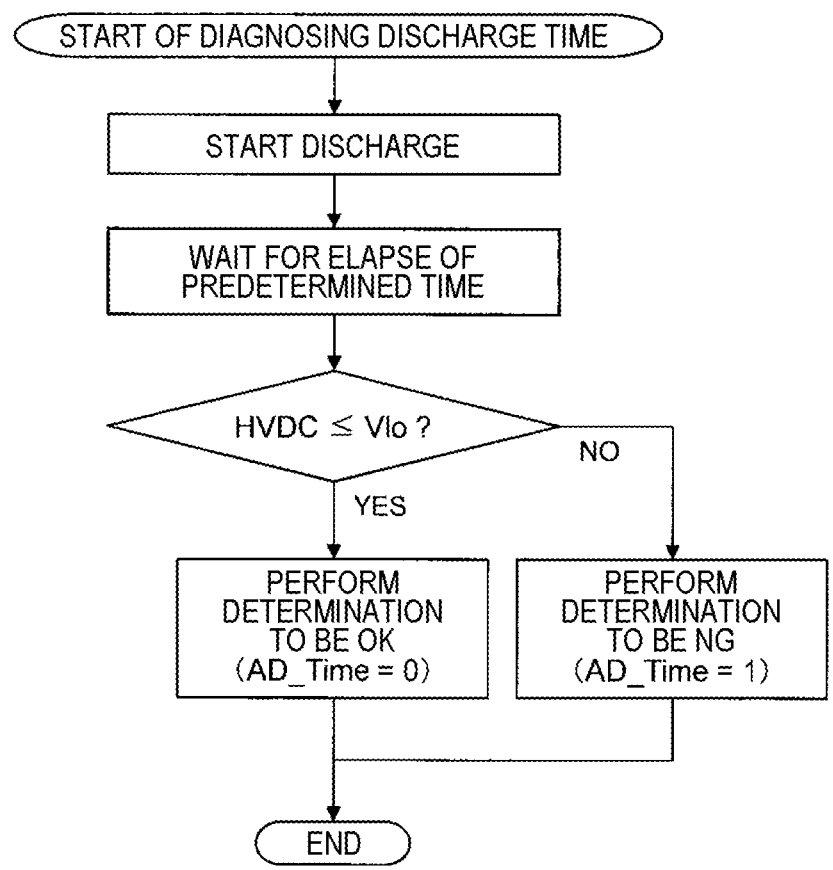
FIG. 4 is a flowchart of diagnosing a discharge time.

FIG. 4 is a flowchart of (1) the diagnosis of the discharge time. In the diagnosis of the discharge time, when the value of the HV voltage after the elapse of a predetermined time after the start of discharge is higher than a predetermined diagnosis threshold value V_lo, the diagnosis result is determined to be NG. As an example, it can be determined as OK when the discharge can be performed to be equal to or lower than 60 V within 5 seconds after the start of the discharge, and it can be determined as NG otherwise. In this case, AD_Time=0 is set when the diagnosis is OK, and AD_Time=1 is set when the diagnosis is NG. As the HV voltage, a detection value of the HV voltage detection circuit 205 is used.

Figure 5:
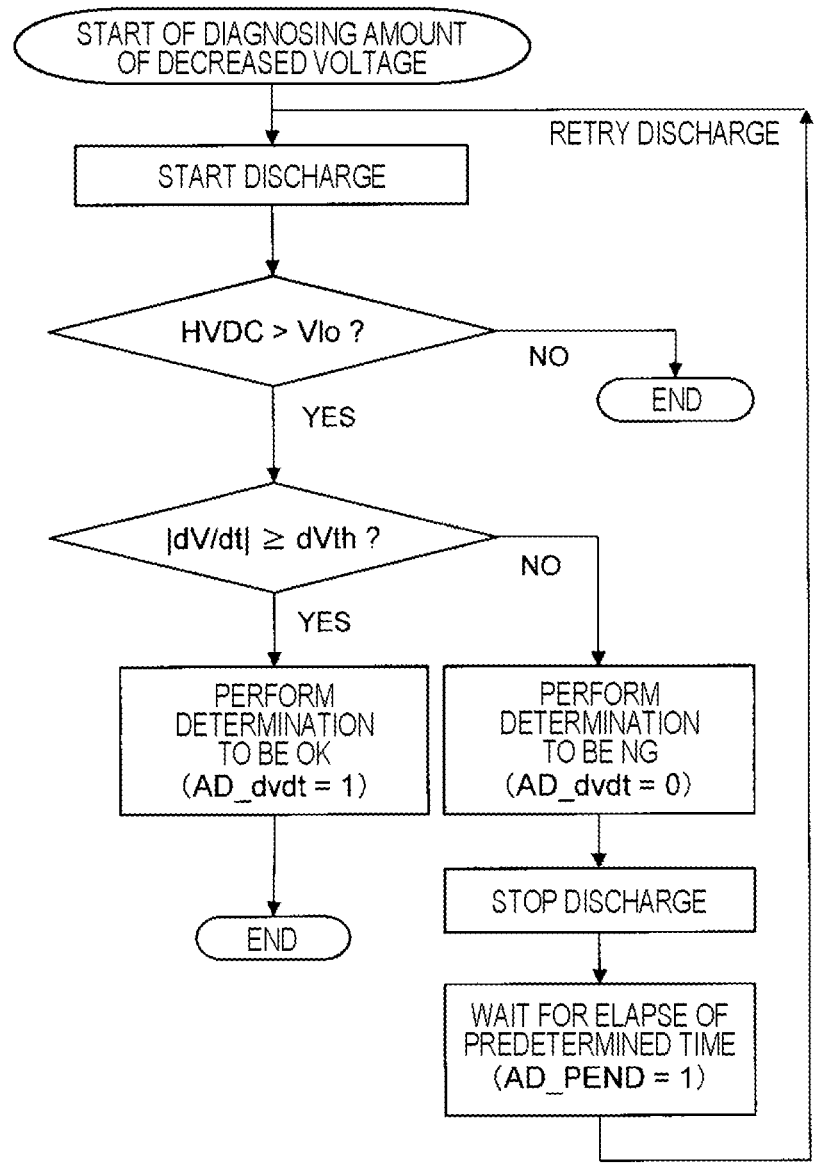
FIG. 5 is a flowchart of diagnosing an amount of a decreased voltage.

FIG. 5 is a flowchart of (2) the diagnosis of the amount of the decreased voltage. The amount of the decreased voltage is diagnosed when the value of the HV voltage is sufficiently high. In this example, the diagnosis is performed when the value of the HV voltage is higher than the diagnosis threshold value V_lo. In the diagnosis of the amount of the decreased voltage, when the change amount of the voltage change of the HV voltage during the discharge (the amount of decrease per unit time) is smaller than a predetermined threshold value dVth, the diagnosis result is determined as NG. For the voltage change of the HV voltage, a detection value of the voltage change detection circuit 204 is used. When the amount of the decreased HV voltage per unit time is equal to or more than the predetermined value dVth, it is determined that the discharge can be normally performed and the diagnosis is OK, and AD_dvdt is set to 1. When the amount of the decreased HV voltage per unit time is less than the predetermined value dVth, it is determined that it is not possible to perform the discharge as expected, and the diagnosis is NG, and AD_dvdt is set to 0.

When the diagnosis of the amount of the decreased voltage is determined to be NG, the discharge is temporarily stopped and the state shifts to a retry state. Here, after the discharge is stopped, the discharge is started again after waiting for a predetermined time. The diagnosis of the amount of the decreased voltage is mainly determined as NG when the contactor 106 is in the closed state. However, it is expected that the temporary contactor closed state is canceled and the contactor is in an open state with the elapse of time, and retry is performed a predetermined number of times. The number of times of retry can be set to any value, and a configuration in which retry is not performed may be adopted.

Figure 6:
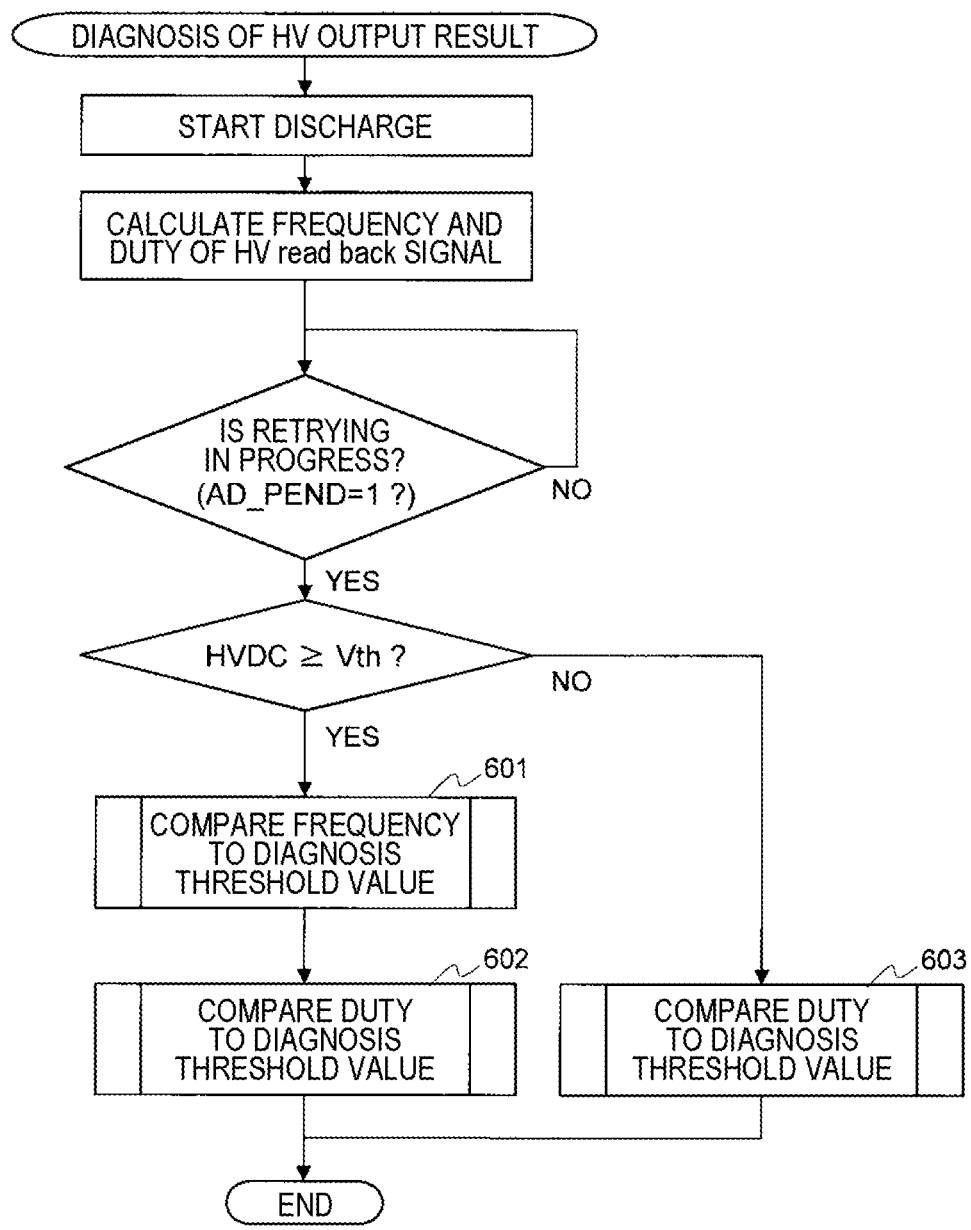
FIG. 6 is a flowchart of diagnosing an HV output result.

FIG. 6 is a flowchart of (3) the diagnosis of the HV output result. The HV output result is diagnosed based on AD_Diag_HV being an HV read back signal received from the discharge circuit by the main control device 102. The diagnosis of the HV output result is classified into a PWM check diagnosis, an ON-fixing diagnosis, and an OFF-fixing diagnosis. The diagnosis for detecting an abnormality differs depending on the case illustrated in the flow. In FIG. 6, instead of directly comparing the AD_OUT signal and an AD_DIAL_HV signal, a method in which a predetermined frequency and a predetermined duty used in generating AD_OUT are stored in the main control device 102 as diagnosis threshold values, and the HV output result is diagnosed using the diagnosis threshold values.

In the diagnosis of the amount of the decreased voltage in FIG. 5, when there is no voltage change and retry of discharge is being continued, the discharge is temporarily stopped, and thus it is not determined that the diagnosis is NG. Therefore, while retry is being continued, diagnosis pending information AD_PEND is set to 1.

In the diagnosis of the HV output result, first, the frequency and the duty of the HV read back signal are calculated. Each of the frequency and the duty is compared to the diagnosis threshold value. The diagnosis threshold value to be compared with the frequency of the HV read back signal is a PWM frequency of AD_OUT at the time points t30 to t31 in FIG. 3. The diagnosis threshold value to be compared with the duty of the HV read back signal is a duty of AD_OUT set at the time points t30 to t31 or t31 to t32 in FIG. 3. In the embodiment of FIG. 3, the duty of AD_OUT at the time points t31 to t32 is 100%.

As described above, in the present embodiment, the pulse of AD_OUT to be compared differs depending on whether the HV voltage is equal to or higher than V_th or lower than V_th. Therefore, also in the diagnosis of the HV output result, cases are classified in accordance with whether or not the HV voltage is equal to or higher than V_th.

When the HV voltage is equal to or higher than V_th, that is, in a region corresponding to the time points t30 to t31 in FIG. 3, both the frequency and the duty are compared to the diagnosis threshold values. First, in Step 601, the frequency of the HV read back signal is compared to the diagnosis threshold value. At this time, when the frequency is different from the expected value, the PWM check diagnosis on the HV side is determined to be NG. Subsequently, in Step 602, the duty is compared, and, when the duty is different from the expected value, the diagnosis can be determined to be NG. In particular, when the duty of the detected HV read back signal is 0%, the OFF-fixing diagnosis on the HV side is determined to be NG. When the duty is 100%, the ON-fixing diagnosis on the HV side is determined to be NG.

When the HV voltage is lower than V_th, AD_OUT is always in the ON state as illustrated in FIG. 3. Thus, the frequency is not compared, and only the duty is compared. Since the duty of AD_OUT is 100%, the diagnosis can be determined to be NG when the duty of the HV read back signal is other than 100%. In particular, when the duty is 0%, the OFF-fixing diagnosis on the HV side is determined to be NG. In other cases, the PWM check diagnosis on the HV side is determined to be NG.

Figure 7:
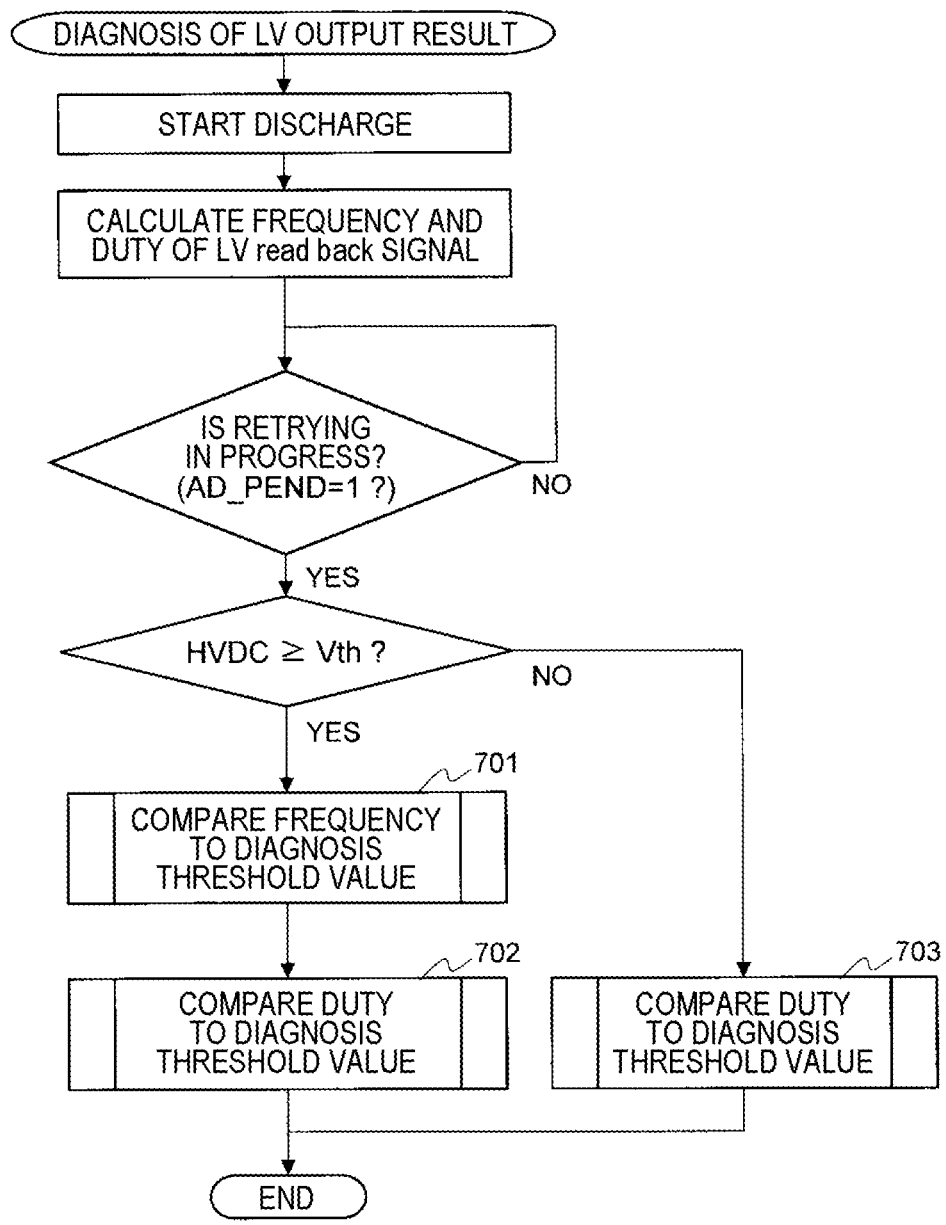
FIG. 7 is a flowchart of diagnosing an LV output result.

FIG. 7 is a flowchart of (4) the diagnosis of the LV output result. The LV output result is diagnosed based on AD_Diag_LV being an LV read back signal received from the sub control device 103 by the main control device 102. The flow of the flowchart in FIG. 7 is substantially similar to the flow in FIG. 6 except that the type of the read back signal is different. Thus, detailed description will be omitted here.

FIG. 8 is a metric diagram for specifying a failure location by combining a plurality of diagnosis results. According to the present invention, the discharge control circuit can specify a failure location by evaluating a combination of the result of (1) the diagnosis of the discharge time, the result of (2) the diagnosis of the amount of the decreased voltage, the result of (3) the diagnosis of the HV output, and the result of (4) the diagnosis of the LV output, which are described above with reference to FIGS. 4 to 7. As the result of (3) the diagnosis of the HV output, and the result of (4) the diagnosis of the LV output, results classified into three types of ON-fixing diagnosis, OFF-fixing diagnosis, and PWM check diagnosis are used.

A time chart corresponding to each failure mode will be described below with reference to FIGS. 9 to 14. As described above, by specifying the failure location, for example, in a design stage, it can be utilized for reviewing the design value and changing the control method. Recognition of a location in which a failure easily occurs can contribute to improvement and development of the technology and can be used for the next product design. Alternatively, it is possible to appropriately perform shift to a safe state by specifying the failure location. characteristic portions will be described below while omitting the description overlapping with FIG. 3.

FIG. 9 is a chart diagram when the discharge amount is insufficient. In FIG. 9, the HV voltage does not decrease up to V_lo or lower after the discharge is started at a time point t90 until a time point t92 after the elapse of a predetermined time, and the value of AD_V_lo remains 0. Therefore, at the time point t92, the diagnosis AD_Time of the discharge time detects the diagnosis NG. In a state where the HV voltage is higher than V_th (time points t90 to t91), the discharge control circuit performs discharge by duty control. Such movement is exhibited when the duty is small or when the number of electric charges consumed by the discharge resistor 108 is small.

In this case, the cause is a problem in the design value of the discharge. Thus, it is necessary to decrease the HV voltage to the threshold value V_lo within a predetermined time by reviewing the design value. Although the amount of the decreased voltage in FIG. 9 is slightly less than that in the normal state, since the charge consumption itself can be appropriately performed, AD_dvdt continuously output 1 being the normal value, in the process of the discharge (period of AD_CMD=1). In addition, the read back signals on the HV side and the LV side also indicate normal values.

FIG. 10 is a chart diagram when the contactor is closed. When the contactor 106 is in the closed state, even though the discharge is started at a time point t100, the HV voltage does not decrease because the capacitor 109 is connected to the battery 105. Since the HV voltage is not lower than V_lo, the diagnosis of the discharge time is determined to be NG (AD_Time=1). Further, since the amount of the decreased voltage per unit time is also less than the threshold value, the diagnosis of the amount of the decreased voltage is determined to be NG (AD_dvdt=0). Then, an operation of performing the retry after a predetermined time is performed. While waiting for retry, pending information AD PEN for the diagnosis is set in order to avoid detection of another diagnosis NG.

When the contactor is temporarily in the closed state due to a mechanical operation timing of the contactor, the discharge is started during the retry, and HVDC decreases to V_lo within a predetermined time. Preferably, a plurality of retries are performed between time points t100 and t103. Even when the close failure has occurred in the contactor 106, in a case where the HV circuit such as the discharge resistor and the LV circuit such as the main control device and the sub control device are normal, only the voltage of the capacitor 109 does not decrease, but the electric charges are normally consumed by the discharge resistor 108. Therefore, the diagnosis of the HV output and the diagnosis of the LV output are determined to be normal (OK). In the discharge control circuit according to the present embodiment, by monitoring the read back signals on the HV side and the LV side, it is possible to confirm that the control circuit on the LV side and the output circuit on the HV side operate normally without failure.

Figure 11:
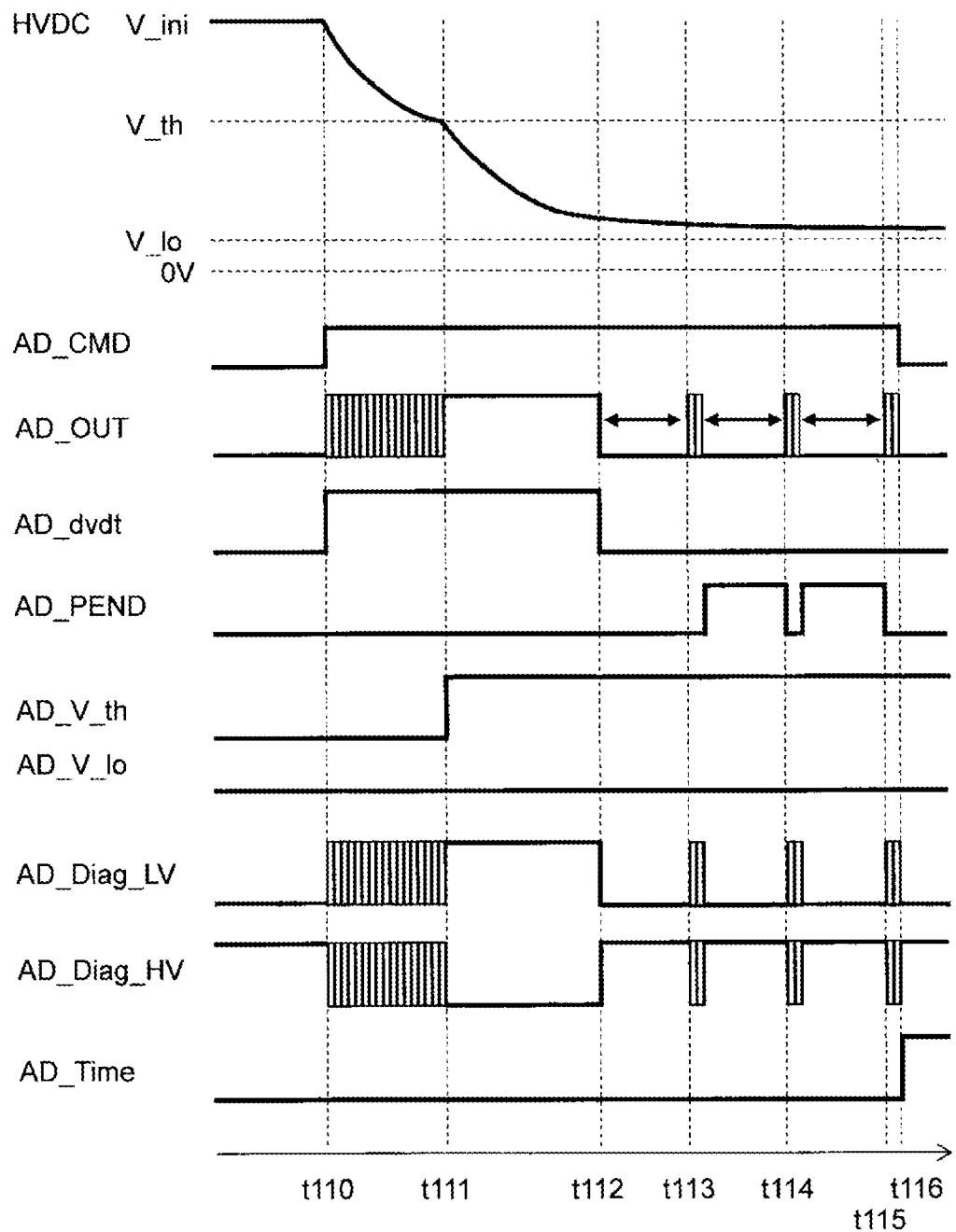
FIG. 11 is a chart diagram when a resistance value changes due to a short-circuit failure of a discharge resistor.

FIG. 11 is a chart diagram when the resistance value changes due to a short-circuit failure of the discharge resistor. Furthermore, FIG. 11 is a chart diagram when the resistance value changes to be low due to the short-circuit failure of the discharge resistor. As the resistance value decreases, the number of electric charges consumed during the discharge decreases, and the amount of the decreased HV voltage becomes less than the expected value. Since the HV voltage does not decrease to V_lo or less within the predetermined time, the diagnosis AD_Time of the discharge time detects the diagnosis NG at a time point t116. Although similar to the case of FIG. 9, in FIG. 11, at a time point t112, the amount of the decreased voltage per unit time is less than the expected value, and the diagnosis of the amount of the decreased voltage is determined to be NG. Then, a function of performing the retry after a predetermined time starts an operation. Also in this case, it can be specified that the discharge amount changes due to the change in the resistance value, but the read back signals on the LV side and the HV side operate as intended, and there is no problem in the control circuit and the output circuit.

Figure 12:
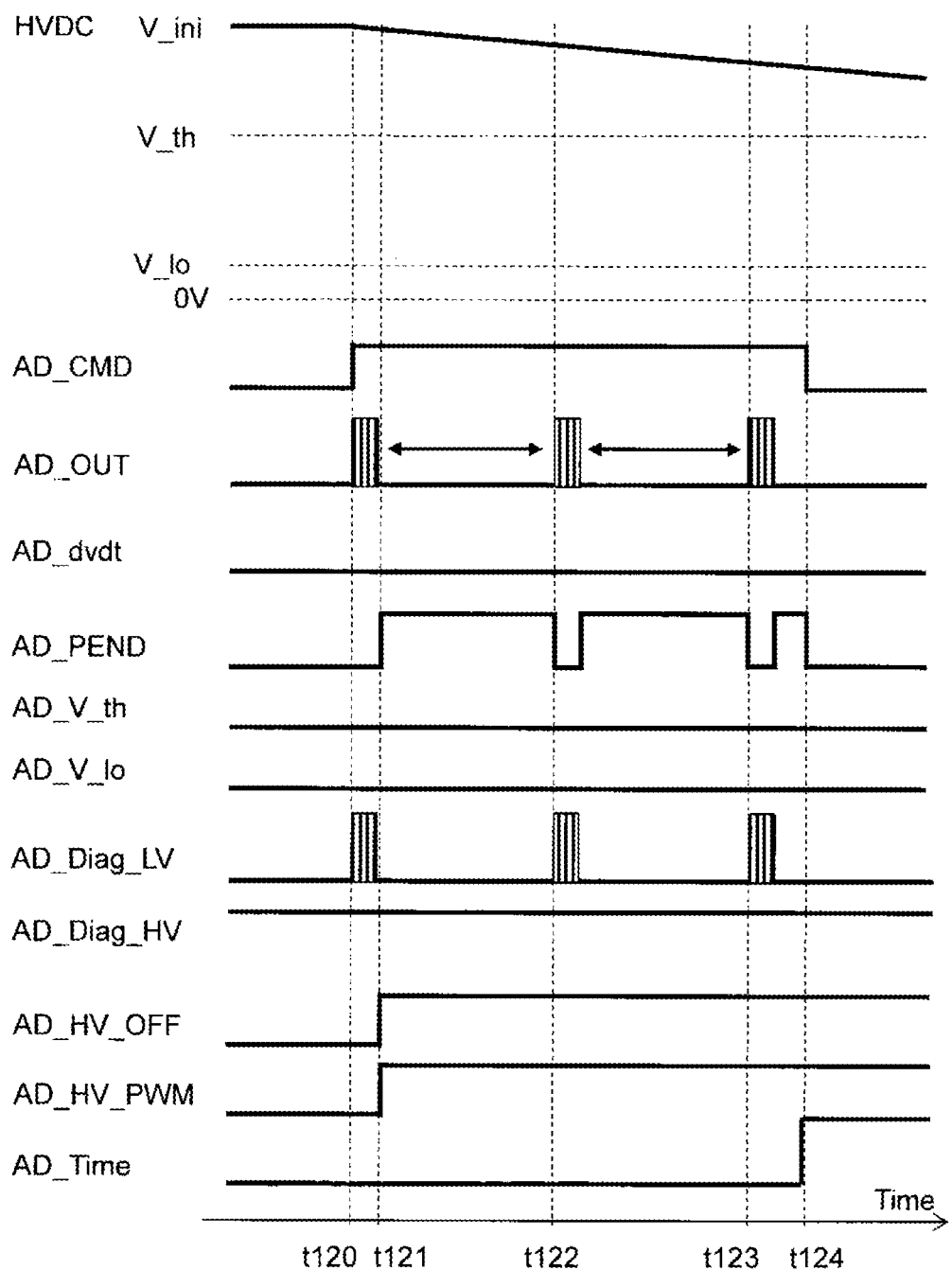
FIG. 12 is a chart diagram when an open-circuit failure of the discharge resistor.

FIG. 12 is a chart diagram when an open-circuit failure of the discharge resistor. When an open-circuit failure has occurred, it is not possible to consume electric charges by the discharge resistor 108, so that the HV voltage decreases only by passive discharge due to power consumption in the internal circuit. As a result, it is not possible to discharge the HV voltage to V_lo or less within the predetermined time, and AD_Time is diagnosed to be NG at a time point t124. In addition, since the discharge amount is insufficient only by the passive discharge, the amount of the decreased voltage per unit time becomes less than the expected value. Therefore, the diagnosis of the amount of the decreased voltage detects NG, and an operation of performing the retry after a predetermined time is repeated.

Here, in the case of the open-circuit failure of the discharge resistor, since the discharge resistor always remains in an OFF state, the HV read back signal (AD_Diag_HV) detects the diagnosis NG of OFF fixing. Furthermore, since the OFF-fixing continues in a region where the discharge by the duty control is supposed to be performed from a time point t120, NG is also detected in the PWM pulse check diagnosis. As a result, at a time point t121, AD_HV_OFF and AD_HV_PWM are determined as the diagnosis NG. The control circuit on the LV side can operate normally during the open-circuit failure of the discharge resistor. Thus, the LV read back signal (AD_Diag_LV) coincides with the discharge instruction AD_OUT.

Figure 13:
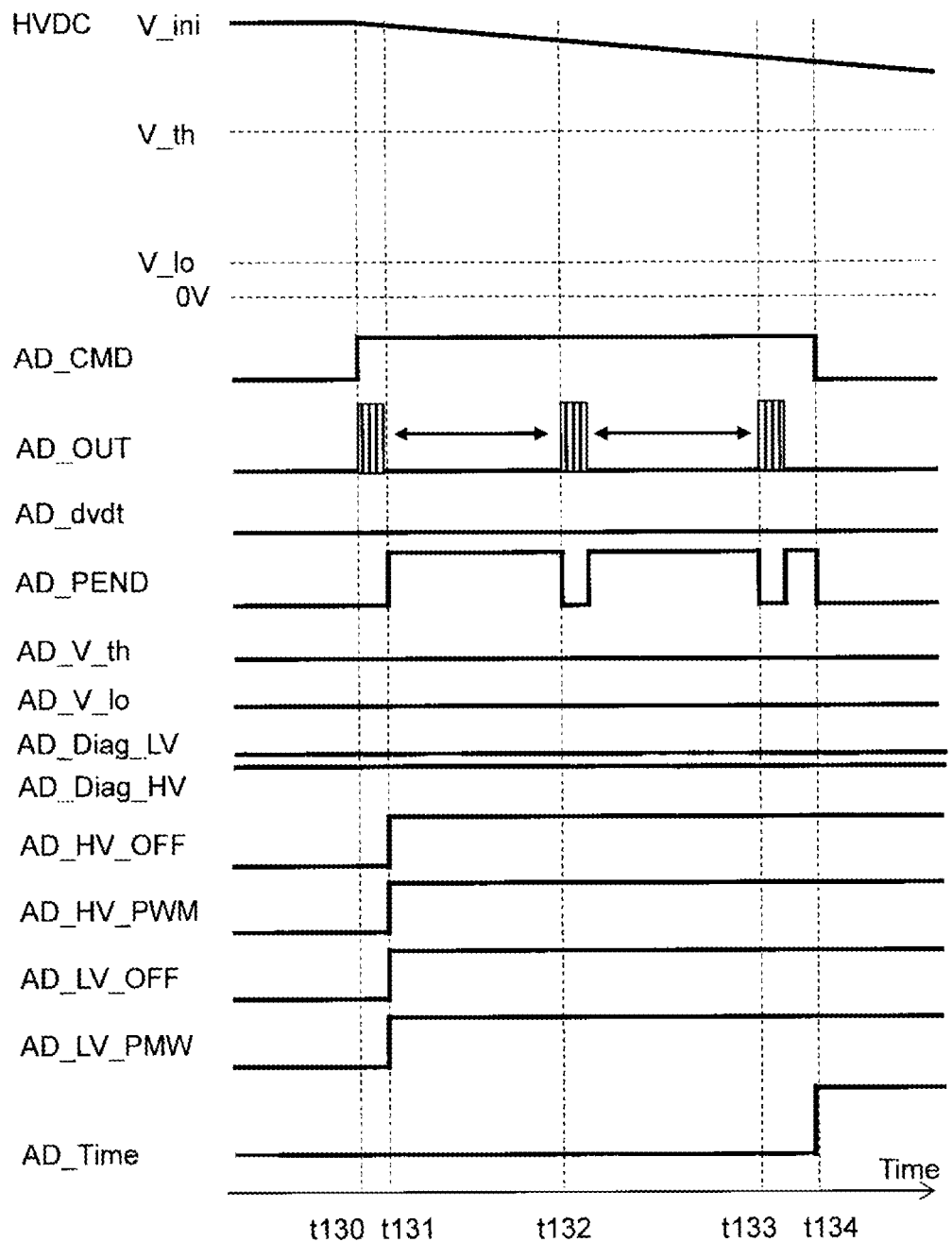
FIG. 13 is a chart diagram in OFF-fixing failure of an output of a sub CPU.

FIG. 13 is a chart diagram in OFF-fixing failure of an output of the sub CPU. FIG. 13 illustrates an operation when a failure has occurred in any of an output unit of the sub control device (sub CPU) on the LV side, the output circuit on the HV side, and a path including the switching element that controls ON/OFF of the discharge. Here, for convenience, a case where a failure has occurred in any of paths including the output circuit and the switching element is also collectively referred to as "OFF-fixing of the sub CPU". Since it is not possible to turn the second switching element 107 on due to the OFF-fixing failure and it is not possible to consume the electric charges in the discharge resistor 108, the HV voltage decreases only by the passive discharge due to the power consumption in the internal circuit. As a result, it is not possible to discharge the HV voltage to V_lo or less within the predetermined time, and AD_Time is diagnosed to be NG at a time point t134. In addition, since the discharge amount is insufficient only by the passive discharge, the amount of the decreased voltage per unit time becomes less than the expected value. Therefore, the diagnosis of the amount of the decreased voltage detects NG, and an operation of performing the retry after a predetermined time is repeated.

When only the HV voltage and the amount of the decreased voltage are focused, the similar descriptions are applied to FIGS. 12 and 13. However, when the OFF-fixing failure of the sub CPU has occurred unlike the open-circuit failure of the discharge resistor in FIG. 12, not only the HV read back signal (AD_Diag_HV) but also the LV read back signal (AD_Diag_LV) exhibit the movement different from that of AD_OUT. As a result, the OFF-fixing diagnosis NG and the PWM check diagnosis NG are detected in both the diagnosis of the HV output and the diagnosis of the LV output. As described above, by monitoring the HV read back signal (AD_Diag_HV) and the LV read back signal (AD_Diag_LV), it is possible to separate failure locations.

FIG. 14 is a chart diagram in ON-fixing failure of the output of the sub CPU. FIG. 14 illustrates an operation when a failure has occurred in any of the output unit of the sub CPU on the LV side, the output circuit on the HV side, and the path including the switching element that controls ON/OFF of the discharge. In particular, FIG. 14 illustrates an operation when the ON-fixing failure has occurred at the moment when the discharge start is instructed. Depending on the timing of the failure occurrence, the same operation as in this chart diagram is not necessarily performed. When the ON-fixing failure of the sub CPU output has occurred, the electric charges can be consumed by the discharge resistor, but it is not possible to perform the discharge by the duty control, and the discharge is always performed in the ON state. Therefore, the discharge is performed at a speed faster than the normal time. Since the HV voltage can be lower than V_lo within the predetermined time, and the discharge is performed at a rate at which the amount of the decreased voltage exceeds the predetermined threshold value, OK is detected in the diagnosis of the discharge time and the diagnosis of the amount of the decreased voltage. However, since both the LV read back signal (AD_Diag_LV) and the HV read back signal (AD_Diag_HV) always continue to be in the ON state, the ON-fixing diagnosis on the LV side and the HV side detects NG. Further, the ON state is always continued in the region where the discharge is to be performed by the duty control. Thus, the PWM check diagnosis NG on the LV side and the HV side is detected.

To summarize the embodiment of the present invention described above, the discharge control circuit according to the present invention includes the discharge circuit in which the discharge resistor 108 and the switching element 107 are connected in series, and the control circuit that controls on/off of the switching element 107 to control discharge by the discharge resistor 108. The control circuit includes the output circuit 203 that outputs a drive signal for driving on/off of the switching element 107, and the main control circuit 102 and/or the sub control circuit 103 (arithmetic operation circuit) that outputs a discharge instruction based on a voltage between both the ends of the discharge circuit, to the output circuit 203. The arithmetic operation circuit includes the detection circuits 204 and 205 that detect the amount of the decreased voltage between both the ends of the discharge circuit, monitors an output of the arithmetic operation circuit as the LV read back signal, and monitors an output of the output circuit 203 as the HV read back signal. As described above, by monitoring the read back signals on the HV side and the LV side, it is possible to specify a failure location in the discharge control circuit.

According to such a discharge control circuit, by combining a plurality of diagnosis functions, when an attempt of active discharge fails, it is possible to specify a failure location in detail, perform appropriate control in accordance with a failure mode, and more reliably shift an inverter to a safe state. In addition, it is possible to contribute to improvement of vehicle maintainability by rapidly specifying a failure site.

For example, when it is determined that the discharge amount is insufficient, it can be used to review the design value of the discharge amount. Alternatively, when the capacitor capacitance of the peripheral device varies depending on the vehicle type, and the voltage does not sufficiently decrease, the discharge may be continued by passive discharge.

When it is determined that the contactor is in the closed state, the process shifts to the retry of the discharge. This is because it is not possible to perform the discharge in the closed state due to a mechanical delay at the time of initial discharge, but the discharge may be possible after a predetermined time. However, the discharge retry function is not essential, and any upper limit number of times may be provided.

In addition, it is possible to provide a function of notifying a driver or the like of the occurrence of an abnormality when it is not possible to normally perform the discharge. In addition, the notification method and the method of controlling the power conversion device may be changed in accordance with the diagnosis result of the discharge abnormality. For example, when a short-circuit failure of the discharge resistor is detected, active discharge may be performed in a state where the resistance value (that is, the discharge amount) changes, and the residual charge after the active discharge may be released by passive discharge.

In addition, by leaving the diagnosis result as a failure history, it is possible to recognize a location where a failure easily occurs in the inverter by analyzing the failure history, and to use the location for a product design having higher safety. In this case, a non-volatile memory for recording the failure history may be further provided.

For example, when an open-circuit failure of the discharge resistor is detected, the discharge resistor may be damaged due to heat generation, and thus the design of the discharge pattern is reviewed. When OFF-fixing or ON-fixing of the sub CPU is detected, the hardware is examined from the viewpoint of circuit damage due to overcurrent, and the durability is considered to be improved.

Hitherto, the embodiment of the present invention has been described in detail with reference to the drawings, but the specific configuration is not limited to the above-described embodiment, and design changes and the like without departing from the gist of the present invention are included in the present invention.

For example, by performing a portion of the diagnosis performed by the main control device 102 by the sub control device 103, it is possible to reduce the calculation load of the main control device 102. In addition, in the above example, AD_OUT is output with a fixed duty until the HV voltage becomes lower than V_th, but multi-stage duty may be provided.

REFERENCE SIGNS LIST

101 power conversion device
102 main control device
103 sub control device
104 motor
105 battery
106 contactor
107 second switching element
108 discharge resistor that consumes electric charges
109 capacitor that stores electric charges
110 first switching element
201 main power supply
202 sub power supply
203 output circuit
204 voltage change detection circuit
205 HV voltage detection circuit

The invention claimed is:

1. A discharge control circuit comprising:
a discharge circuit in which a discharge resistor and a switching element are connected in series; and
a control circuit that controls on/off of the switching element to control discharge by the discharge resistor,
wherein the control circuit includes
an arithmetic operation circuit that outputs a control signal for controlling the switching element based on a voltage between both ends of the discharge circuit, and
an output circuit that outputs a drive signal for driving the switching element based on the control signal, and
the arithmetic operation circuit includes
a detection-circuit monitoring unit that detects an amount of decreased voltage between both the ends of the discharge circuit,
an arithmetic-operation-circuit monitoring unit that monitors an output of the arithmetic operation circuit, and
an output-circuit monitoring unit that monitors an output of the output circuit.

2. The discharge control circuit according to claim 1, wherein, when the voltage between both the ends of the discharge circuit is not lower than a predetermined threshold value within a predetermined time after the arithmetic operation circuit outputs the control signal for an instruction of discharge, the arithmetic operation circuit determines a circuit in which an abnormality has occurred, among the discharge circuit, the arithmetic operation circuit, and the output circuit, based on a first signal and a second signal, the first signal indicating a monitoring result of the arithmetic-operation-circuit monitoring unit, and the second signal indicating a monitoring result of the output-circuit monitoring unit.

3. The discharge control circuit according to claim 2, wherein whether or not an abnormality has occurred in the arithmetic operation circuit is determined based on a frequency or a duty of the first signal.

4. The discharge control circuit according to claim 3, wherein whether or not an abnormality has occurred in the output circuit or the discharge circuit is determined based on a frequency or a duty of the second signal.

5. The discharge control circuit according to claim 4, wherein
the control signal is output to alternately control on/off of the switching element at a predetermined frequency, and
the circuit in which a failure has occurred is determined based on a comparison between the control signal and the first signal and a comparison between the control signal and the second signal.

6. The discharge control circuit according to claim 2, further comprising:
a non-volatile memory that records information on an occurrence of a failure detected by the arithmetic operation circuit, as a failure history.

7. A power conversion device comprising:
the discharge control circuit described in claim 1; and
a smoothing capacitor and an inverter circuit connected to the discharge circuit in parallel.

* * * * *